Dec. 31, 1946.　　　　C. G. BOONE　　　　2,413,430
AUTOMATIC DRAINAGE DEVICE
Filed Jan. 17, 1944
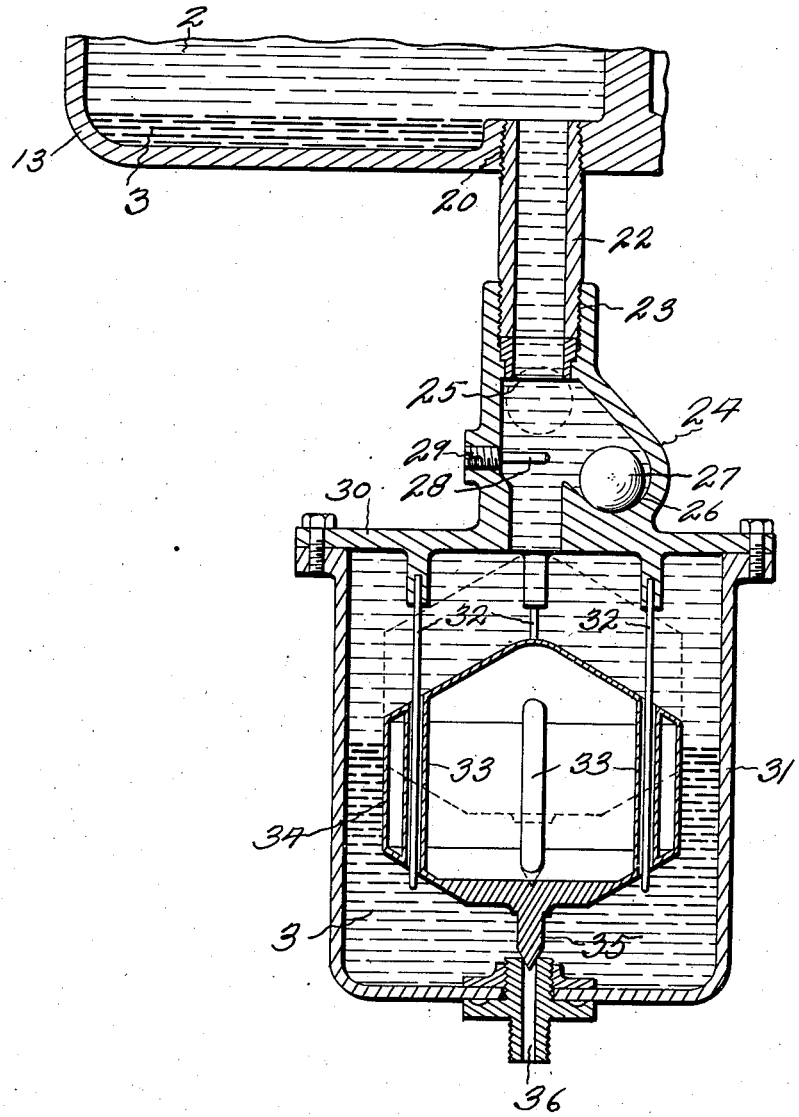
Charles G. Boone
INVENTOR
BY
ATTORNEY Patented Dec. 31, 1946

2,413,430

UNITED STATES PATENT OFFICE 2,413,430

AUTOMATIC DRAINAGE DEVICE

Charles G. Boone, Tulsa, Okla., assignor of one-half to Royal A. McIntyre, Tulsa, Okla.

Application January 17, 1944, Serial No. 518,613

3 Claims. (Cl. 210—54)

The invention relates to automatic drainage devices for automatically draining a heavier liquid, for instance condensate in the form of water accumulated below a lighter liquid, for instance gasoline, thereby preventing excessive accumulation of water in the line.

A further object is to provide an automatic drainage device in connection with a trap, and in which trap the heavy liquid such as condensate water flows and gravitates to the bottom below a lighter liquid, and float controlled means cooperating with a drain valve seat for automatically allowing the discharge of the heavy liquid below a predetermined level, thereby preventing excessive accumulation of the heavy liquid.

A further object is to control the float control means by a float having sufficient reserve buoyancy to float on the heavy liquid, but not sufficient to float in the lighter liquid above the heavy liquid, so the float will be controlled in its upward and downward movement by the liquid level of the heavy liquid.

A further object is to provide a float controlled drainage means for water in a carbureter or the like, actuated by the water liquid level so the water in the carbureter, or pipe leading thereto, will be intermittently discharged through a drainage valve, thereby preventing the stopping of an airplane engine when in flight, or when maneuvering in the air. At the present time it is the practice to drain airplane carbureters from time to time, however this is often neglected, and many accidents are caused by the accumulation of excessive water in the carbureters.

A further object is to provide an auxiliary trap having the water drainage float therein, and which trap may be attached in the conventional drain opening of a carbureter, thereby obviating the modification of the carbureter now in use to apply the device. Also to provide valve check means in connection with the auxiliary device for cutting off the flow of gasoline and water to the carbureter when the airplane is flying upside down.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

Referring to the drawing, wherein the single figure shows a vertical longitudinal sectional view through the auxiliary attachment and a portion of a bowl of a conventional form of carbureter, the carbureter bowl indicated by the numeral 13, the water by 3 and the gasoline at 2, and the auxiliary attachment is connected to the carbureter bowl 13 by a pipe 22, threaded into the drain opening 20 thereof. Pipe 22 may be of any length desired, and extends downwardly and has threaded thereon at 23 a valve casing 24 having a valve seat 25 in the upper end thereof. Disposed in a pocket 26 in the valve casing 24 is a ball valve 27, which assumes the dotted line position when the plane is flying upside down, thereby preventing flooding of the carbureter and the danger of fire. The ball 27 is guided to seated position when the plane is upside down by the finger 28 carried by the screw 29. The lower end of valve casing 24 terminates in a cover plate 30, which cover plate is secured to the upper end of the float bowl 31 in the bottom of which bowl the water 3 collects below the gasoline 2.

Extending downwardly from the cover plate 30 are float guide rods 32, which guide rods extend downwardly through tubular members 33 carried by the float 34, therefore it will be seen that the float is positively guided upwardly and downwardly as the level of the water 3 varies. The lower end of the float 34 is provided with a needle valve 35, which cooperates with the discharge port 36 carried by the bottom of the bowl 31. When the water level rises above a predetermined level the float 34 moves upwardly, unseating the needle valve 35 and allows the discharge of the excess water or condensate.

From the above it will be seen that float controlled means is provided between a heavy liquid and a lighter liquid whereby excessive accumulation of heavy liquid is discharged, thereby preventing excessive heavy liquid from being carried along with the lighter liquid, consequently flooding of carbureters or other lines with water or other heavy liquid is prevented. Although the device has been shown and described in connection with two liquids of different weight, it is obvious it can be used with more than two liquids, and the device can be used in connection with fluids for various purposes, however it is particularly adapted for use in connection with carbureters of airplanes.

The invention having been set forth what is claimed as new and useful is:

1. The combination with an airplane carbureter bowl, of an auxiliary water condensate device therefor, said device comprising a trap bowl disposed below the carbureter bowl, a pipe connection between the upper end of the trap bowl and the carbureter bowl, a normally open check valve in said pipe connection and adapted to close when the airplane is inverted and the trap bowl is above the carbureter bowl, a discharge port in the bottom of the trap bowl, an upwardly and downwardly guided float within the trap bowl and having sufficient reserve buoyancy to rise and fall with the rise and fall of the water level within the trap bowl, said float having a valve cooperating with the discharge port in the trap bowl for intermittently discharging water from the bottom of the trap bowl.

2. A device as set forth in claim 1 wherein the guiding means for the float in the trap bowl comprises depending rods within the trap bowl and extending through the float.

3. A device as set forth in claim 1 including a cover for the trap bowl, an upwardly extending chambered member carried by the cover and forming the lower portion of the pipe connection between the carbureter bowl and the trap bowl, said check valve comprising a ball in an off-set chamber of the extension of the cover and means carried by said extension for engaging the ball when the carbureter and trap bowls are inverted for guiding the ball to closed position.

CHARLES G. BOONE.